(12) United States Patent
Cui

(10) Patent No.: US 11,391,577 B2
(45) Date of Patent: Jul. 19, 2022

(54) DYNAMICALLY MODELLING OBJECTS IN MAP

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 302 days.

(21) Appl. No.: 16/703,743

(22) Filed: Dec. 4, 2019

(65) Prior Publication Data
US 2021/0172743 A1 Jun. 10, 2021

(51) Int. Cl.
| | |
|---|---|
| *G01C 21/32* | (2006.01) |
| *G09B 29/00* | (2006.01) |
| *G06F 16/44* | (2019.01) |
| *G06F 16/29* | (2019.01) |
| *G06V 20/56* | (2022.01) |

(52) U.S. Cl.
CPC ............ *G01C 21/32* (2013.01); *G06F 16/29* (2019.01); *G06F 16/444* (2019.01); *G06V 20/56* (2022.01); *G09B 29/007* (2013.01)

(58) Field of Classification Search
CPC .......... G01C 21/32; G01C 21/34; G06K 9/62; G06K 9/40; G08G 5/00; B60W 40/04; G05D 1/02; G01W 1/10; G08B 1/08
See application file for complete search history.

(56) References Cited

U.S. PATENT DOCUMENTS

| | | | |
|---|---|---|---|
| 6,453,233 B1 * | 9/2002 | Kato | G06F 16/25 701/451 |
| 8,224,795 B2 | 7/2012 | Nomura | |
| 8,310,361 B1 * | 11/2012 | Stout | G06F 16/29 340/539.2 |
| 9,140,566 B1 | 9/2015 | Curtis et al. | |
| 9,612,123 B1 * | 4/2017 | Levinson | G01C 21/32 |
| 10,332,405 B2 * | 6/2019 | Kopardekar | G08G 5/0043 |
| 2006/0291744 A1 * | 12/2006 | Ikeda | G06T 5/006 382/293 |
| 2007/0126605 A1 * | 6/2007 | Aleksic | G09B 29/102 340/995.14 |
| 2009/0177706 A1 * | 7/2009 | Takahata | G08G 1/0969 |
| 2010/0063727 A1 * | 3/2010 | Umezu | G08G 1/0969 701/532 |
| 2011/0040478 A1 * | 2/2011 | Rinscheid | G06F 21/6218 701/532 |
| 2011/0106431 A1 * | 5/2011 | Tomobe | G01C 21/32 701/533 |
| 2011/0270798 A1 * | 11/2011 | Nagasaka | G01C 21/32 707/609 |
| 2012/0065811 A1 * | 3/2012 | Nakamura | G01C 21/32 701/1 |
| 2013/0275371 A1 * | 10/2013 | Chang | G01C 21/32 707/609 |

(Continued)

*Primary Examiner* — Yuri Kan
(74) *Attorney, Agent, or Firm* — Sheppard Mullin Richter & Hampton LLP

(57) ABSTRACT

Provided herein is a system comprising: one or more processors; and a memory storing instructions that, when executed by the one or more processors, causes the system to perform: identifying, in a map, one or more entities that change over time; predicting an amount of change of the identified one or more entities over time; and updating the map based on the predicted amount of change of the identified one or more entities over time.

17 Claims, 8 Drawing Sheets

(56) References Cited

U.S. PATENT DOCUMENTS

| | | | |
|---|---|---|---|
| 2015/0066366 A1* | 3/2015 | Pang | G06Q 20/14 |
| | | | 701/532 |
| 2015/0212236 A1* | 7/2015 | Haas | G06T 7/20 |
| | | | 382/100 |
| 2016/0047658 A1* | 2/2016 | Nishide | G01C 21/32 |
| | | | 701/532 |
| 2016/0259814 A1* | 9/2016 | Mizoguchi | G01C 21/3837 |
| 2018/0004211 A1* | 1/2018 | Grimm | G01C 21/3461 |
| 2018/0067495 A1* | 3/2018 | Oder | B60W 10/04 |
| 2018/0067966 A1* | 3/2018 | Oder | G01S 13/865 |
| 2018/0188045 A1* | 7/2018 | Wheeler | G06K 9/6267 |
| 2018/0216943 A1* | 8/2018 | Hawkins | G01C 21/32 |
| 2018/0299557 A1* | 10/2018 | Yi | G01S 17/89 |
| 2018/0307915 A1* | 10/2018 | Olson | G05D 1/0251 |
| 2019/0019330 A1* | 1/2019 | Miyaoka | G01C 21/32 |
| 2019/0084577 A1* | 3/2019 | Nobre | G05D 1/0088 |
| 2019/0228262 A1* | 7/2019 | Gonzalez | A63F 13/2145 |
| 2019/0301873 A1* | 10/2019 | Prasser | G06T 17/05 |
| 2019/0303725 A1* | 10/2019 | Gurvich | G06N 3/0454 |
| 2020/0132477 A1* | 4/2020 | Averilla | G01S 17/931 |
| 2020/0145569 A1* | 5/2020 | Wheeler | G06T 7/55 |
| 2020/0393261 A1* | 12/2020 | Zhang | G01C 21/3492 |
| 2021/0004363 A1* | 1/2021 | Bailly | G06F 16/235 |
| 2021/0063165 A1* | 3/2021 | Mercep | G01C 21/30 |
| 2021/0190512 A1* | 6/2021 | Choi | G06K 9/00791 |
| 2021/0190535 A1* | 6/2021 | Tomioka | G05D 1/0251 |

* cited by examiner

DYNAMICALLY MODELLING OBJECTS IN MAP

TECHNICAL FIELD

The present disclosure relates generally to map display systems and navigational systems, particularly for vehicle such as autonomous vehicles.

BACKGROUND

Currently, maps such as satellite maps may not be constantly updated, thereby resulting in presentation of out-of-date, inaccurate information. For instance, maps such as satellite maps may include information of a construction site with construction walls and equipment. If the satellite maps are not updated, the information of the construction site, such as a current status of the construction site, may be out-of-date. For instance, construction may have been completed, but a status of the completion may not have been reflected. Additionally, seasonal changes, for example, in plants and precipitation, may not be reflected if the satellite maps are not updated. These shortfalls are addressed by the present disclosures, which provide an efficient and effective system and method of updating objects in a map that change over time, sometimes without a need of constantly updating the map. Providing a map with the updated objects may assist a driver or a vehicle in navigation, for example, by providing updated information of detours.

SUMMARY

Various embodiments of the present disclosure provide a system comprising: one or more processors; and a memory storing instructions that, when executed by the one or more processors, causes the system to perform: identifying, in a map, one or more entities that change over time; predicting an amount of change of the identified one or more entities over time; and updating the map based on the predicted amount of change of the identified one or more entities over time.

In some embodiments, the instructions further cause the system to perform: determining an amount of actual change of one or more of the identified entities over time; and updating the predicted amount of change of one or more of the identified entities over time based on the determined amount of actual change of one or more of the identified entities.

In some embodiments, the instructions further cause the system to perform: in response to the amount of actual change deviating from the predicted amount of change of any of the one or more identified entities, determining whether any of the one or more of the identified entities is correctly identified; and in response to determining that any of the one or more of the identified entities is not correctly identified, correcting an identification of any of the one or more of the identified entities determined not to be correctly identified.

In some embodiments, the predicting an amount of change of the identified one or more entities over time comprises predicting the amount of change based on historical information of the identified one or more entities over time.

In some embodiments, the instructions further cause the system to perform: determining an amount of actual change of one or more second entities not identified as changing over time; in response to the amount of actual change of one or more of the second entities exceeding a threshold amount, identifying the one or more of the second entities as changing over time.

In some embodiments, the one or more entities comprise a construction site or a detour.

In some embodiments, the identifying one or more entities that change over time comprises identifying one or more entities that change seasonally.

In some embodiments, the one or more entities that change seasonally comprise plants, wildlife, and precipitation.

In some embodiments, the identifying one or more entities that change over time comprises identifying one or more entities that change based on one or more weather or climate conditions.

In some embodiments, the predicting the amount of change of the identified one or more entities over time comprises: in response to identifying the one or more entities than change based on one or more weather or climate conditions, predicting the amount of change based on one or more of the weather or climate conditions.

Various embodiments of the present disclosure provide a method implemented by a computing system including one or more processors and storage media storing machine-readable instructions, wherein the method is performed using the one or more processors, the method comprising: identifying, in a map, one or more entities that change over time; predicting an amount of change of the identified one or more entities over time; and updating the map based on the predicted amount of change of the identified one or more entities over time.

In some embodiments, the method further comprises: determining an amount of actual change of one or more of the identified entities over time; and updating the predicted amount of change of one or more of the identified entities over time based on the determined amount of actual change of one or more of the identified entities.

In some embodiments, the method further comprises: in response to the amount of actual change deviating from the predicted amount of change of any of the one or more identified entities, determining whether any of the one or more of the identified entities is correctly identified; and in response to determining that any of the one or more of the identified entities is not correctly identified, correcting an identification of any of the one or more of the identified entities determined not to be correctly identified.

In some embodiments, the predicting an amount of change of the identified one or more entities over time comprises predicting the amount of change based on historical information of the identified one or more entities over time.

In some embodiments, the method further comprises: determining an amount of actual change of one or more second entities not identified as changing over time; and in response to the amount of actual change of one or more of the second entities exceeding a threshold amount, identifying the one or more of the second entities as changing over time.

In some embodiments, the one or more entities comprise a construction site or a detour.

In some embodiments, the identifying one or more entities that change over time comprises identifying one or more entities that change seasonally.

In some embodiments, the one or more entities that change seasonally comprise plants, wildlife, and precipitation.

In some embodiments, the identifying one or more entities that change over time comprises identifying one or more entities that change based on one or more weather or climate conditions.

In some embodiments, the predicting the amount of change of the identified one or more entities over time comprises: in response to identifying the one or more entities than change based on one or more weather or climate conditions, predicting the amount of change based on one or more of the weather or climate conditions.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
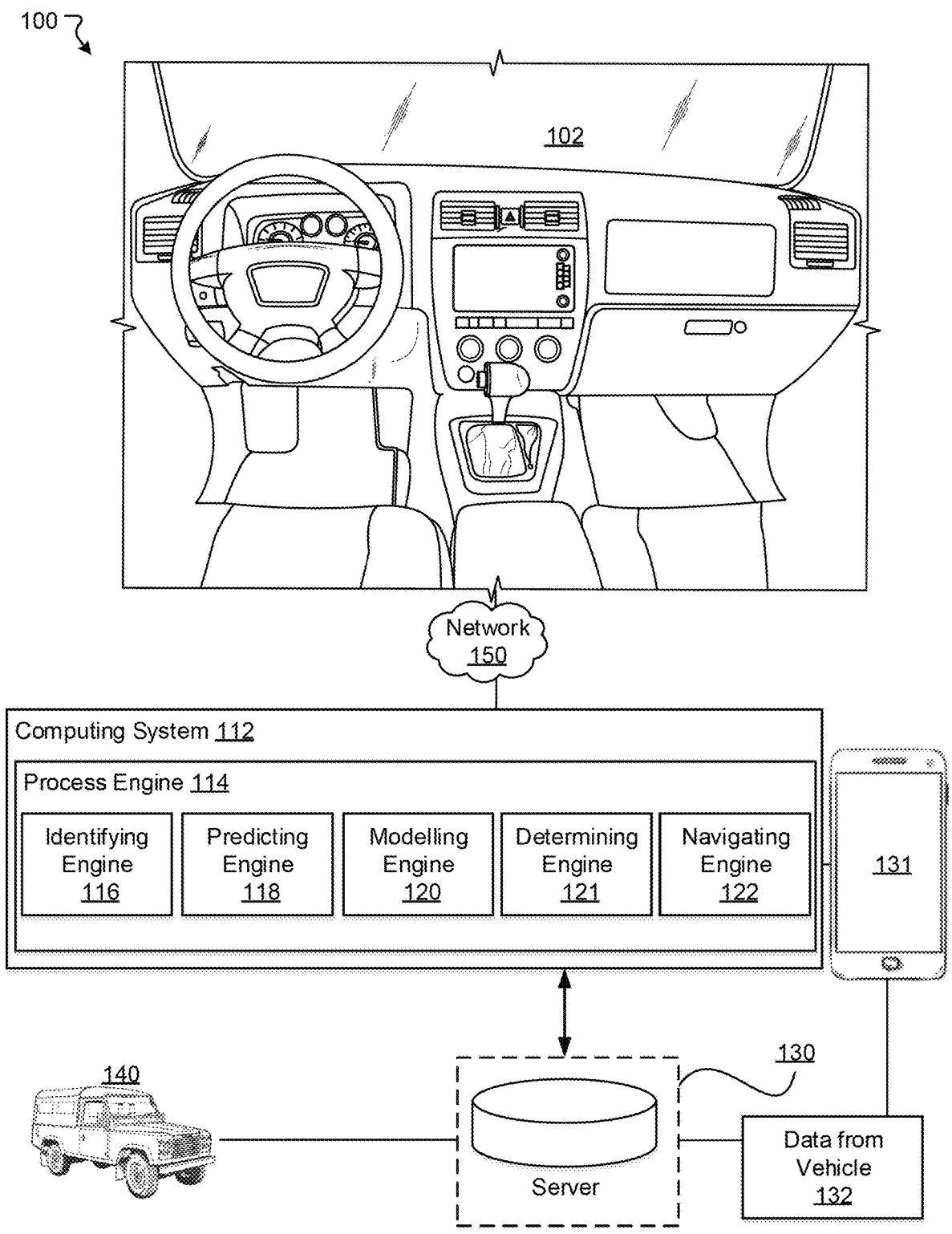
FIG. 1 illustrates an example environment of a system that identifies, in a map, one or more entities that change over time, predicts an amount of change of the identified one or more entities over time, and updates the map based on of the predicted amount of change of the identified one or more entities over time.

FIG. 1 illustrates an example environment 100 of a system that identifies, in a map, one or more entities that change over time, predicts an amount of change of the identified one or more entities over time, and models the map based on of the predicted amount of change of the identified one or more entities over time. In various embodiments, at least one computing system 112 that includes one or more processors and memory, may be connected, over a network 150, to a device 131. The at least one computing system 112 may be physically and/or electrically connected to a vehicle 102. In some embodiments, the at least one computing system 112 may be integrated as part of the vehicle 102. In various embodiments, the vehicle 102 may include LiDAR, active Doppler sensors, camera, GPS, and/or ultrasonic sensors, to obtain data and to determine one or more driving or navigation actions. One or more users may, through the device 131, request, view, and/or access details of the map, entities, and/or parameters of the entities or the map such as the predicted amount of change of one or more entities.

The processors may be configured to perform various operations by interpreting machine-readable instructions. In some embodiments, the example environment 100 may be implemented as a data platform. In some embodiments, the example environment 100 may be configured to interact with at least one computing system 112 of the data platform. In various embodiments, the at least one computing system 112 of the data platform may coordinate and/or control one or more operations of identifying, in a map, one or more entities that change over time, predicting an amount of change of the identified one or more entities over time, and modelling the map based on of the predicted amount of change of the identified one or more entities over time.

In some embodiments, the computing system 112 may include a process engine 114. The process engine 114 may include an identifying engine 116, a predicting engine 118, a modelling engine 120, a determining engine 121, and a navigating engine 122. The process engine 114 may be executed by the processor(s) of the computing system 112 to perform various operations including those operations described in reference to the identifying engine 116, the predicting engine 118, the modelling engine 120, the determining engine 121, and the navigating engine 122. In general, the process engine 114 may be implemented, in whole or in part, as software that is capable of running on one or more computing devices or systems. In one example, the process engine 114 may be implemented as or within a software application running on one or more computing devices (e.g., user or client devices) and/or one or more servers (e.g., network servers or cloud servers, servers 130). In some instances, various aspects of the identifying engine 116, the predicting engine 118, the modelling engine 120, the determining engine 121, and the navigating engine 122 may be implemented in one or more computing systems and/or devices. In some instances, one or more of the identifying engine 116, the predicting engine 118, the modelling engine 120, the determining engine 121, and the navigating engine 122 may be combined or integrated into a single processor, and some or all functions performed by one or more of the identifying engine 116, the predicting engine 118, the modelling engine 120, the determining engine 121, and the navigating engine 122 may not be spatially separated, but instead may be performed by a common processor. The environment 100 may also include the one or more servers 130 accessible to the computing system 112. The one or more servers 130 may store and update information of which entities change over time, and a rate of change of the entities over time. For example, the one or more servers 130 may store data indicating that road signs such as stop signs and traffic lights, road markings such as lane dividers and median strips do not change over time, but that construction sites and walls, plants, wildlife, other vehicles, and precipitation do change over time. The computing system 112 may identify whether an object or entity does change over time, for example, by determining a type of the object or entity.

In some embodiments, the one or more servers 130 may integrate data from different sensors. In other embodiments, the one or more servers 130 may keep the data from the different sensors separate. The one or more servers 130 may be accessible to the computing system 112 either directly or over the network 150. In some embodiments, the one or more servers 130 may store data that may be accessed by the process engine 114 to provide the various features described herein. In some instances, the one or more servers 130 may include federated data stores, databases, or any other type of data source from which data may be stored and retrieved, for example. In some implementations, the one or more servers 130 may include various types of data sets on which determinations of accuracy or consistency with other information can be made. In general, a user operating a computing device can interact with the computing system 112 over the network 150, for example, through one or more graphical user interfaces and/or application programming interfaces. The one or more servers 130 may store data 132 from the vehicle 102 and exchange the data 132 with another vehicle 140. The one or more servers 130 may store data from the another vehicle 140 and exchange the data from the another vehicle 140 with the vehicle 102. The one or more servers 130 may exchange data from the one or more servers 130 with the vehicle 102 or the another vehicle 140.

The identifying engine 116 may be configured to identify entities or objects that change over time. The identifying engine 116 may identify entities or objects by category or type. The identifying engine 116 may use machine learning, deep learning, neural networks, or other models to detect entities or objects from a map such as a satellite map or a topographical map, or map data. The identifying engine 116 may identify entities or objects based on historical data, such as information previously obtained from map data collection. The identifying engine 116 may update entities or objects determined to change over time. For instance, a status an entity or object previously not determined to change over time may be updated to an identified entity or object that changes over time. For example, a landmark previously not determined to change over time may be determined, via a map data collection, to change over time as a result of renovation or demolition. The identifying engine 116 may update a status of the landmark as an identified entity or object. The identifying engine 116 may, in response to an amount of actual change or a rate of actual change deviating from a predicted amount of change of any of the one or more identified entities, determine whether any of the one or more of the identified entities is correctly identified. The identifying engine 116 may, in response to determining that any of the one or more of the identified entities is not correctly identified, correct an identification of any of the one or more of the identified entities determined not to be correctly identified. For example, the identifying engine 116 may have originally identified an entity or object as a construction site. If the predicting engine 118 predicts that the object or entity identified as a construction site may be completed in 6 months, but actual map data acquired 3 months later indicates that the object or entity has not changed, the identifying engine 116 may determine whether the entity or object has been misidentified. If the identifying engine 116 determines that the entity or object has been misidentified, the identifying engine 116 may reidentify the entity or object, for example, as a building.

In some embodiments, the identifying engine 116 may identify construction sites, walls or construction entities as entities or objects that change over time. In other examples, the identifying engine 116 may identify plants such as trees and grass as entities that change seasonally, and/or based on one or more weather or climate conditions such as temperature, amount of precipitation, and/or amount of sunlight. In other examples, the identifying engine 116 may identify entities or objects such as buildings, streets, bridges, nuclear power plants, and other infrastructure that degrade over time, or identify or recognize materials such as steel or reinforced concrete subject to mechanical, chemical, thermal, or other stresses that degrade over time.

The predicting engine 118 may be configured to predict an amount of change of the identified one or more entities or objects over time, or predict a rate of change of the identified one or more entities or objects over time. In some embodiments, the predicting engine 118 may be configured to predict a type of change of one or more of the identified entities or objects over time. In some examples, the predicting engine 118 may predict that one or more of the entities or objects changes based on a logarithmic relationship over time. In some examples, the predicting engine 118 may predict that one or more of the entities or objects changes based on an exponential, power, linear, Gompertz, or Lloyd-Lipow relationship over time. In some examples, the predicting engine 118 may predict that one or more of the entities or objects changes seasonally over time. In some examples, the predicting engine 118 may predict a time scale of the one or more entities or objects. For example, the predicting engine 118 may predict that a construction project may be completed in a year based, for example, on historical data of previous construction projects of a same or similar type. For example, the predicting engine 118 may predict a completion time of a construction project based on historical data of previous construction projects in a same region or time period. The predicting engine 118 may update the predicted amount of change or the predicted rate of change based on a determined amount of actual change of the respective entity or object. For example, if the predicting engine 118 originally predicted that a construction project at a site would be completed in 6 months and halfway completed in 3 months, but actual map data captured indicated that the construction project was only halfway completed in 6 months, the predicting engine 118 may update its prediction based on a time scale of the actual map data captured. For example, the predicting engine 118 may predict that the construction project will be completed within 12 months and that it will take an additional 6 months, instead of an additional 3 months, to complete the construction project. In other examples, the predicting engine 118 may update its prediction without changing its original time scale. For instance, the predicting engine 118 may keep its original prediction that the halfway completed construction project will take another 3 months, and not another 6 months, to complete, even though a first half of the construction project took 6 months to complete. In other examples, the predicting engine 118 may predict that the halfway completed construction project will take another 4.5 months to be completed. In some embodiments, the predicting engine 118 may predict changes to other entities or objects resulting from the change in the one or more entities or objects over time. For example, the predicting engine 118 may predict that a construction site results in a detour, and that after the construction has been completed, the detour may be removed.

The predicting engine 118 may further predict a change in an entity or object that changes seasonally, and/or based on one or more weather or climate conditions such as temperature, amount of precipitation, and/or amount of sunlight. For example, the predicting engine 118 may use a lookup table or algorithm to predict a change over time and/or a current status in an entity or object. For example, the predicting engine 118 may predict a height of grass, a color of a plant, and/or distribution of wildlife, based on the one or more weather or climate conditions.

The modelling engine 120 may model the map based on the predicted amount of change or the predicted rate of change of the identified one or more entities or objects over time according to the predicting engine 118. In some embodiments, the modelling engine 120 may continuously render or model, in the map, a construction site to show a predicted stage or completion rate of the construction site at a current time. In some embodiments, the modelling engine 120 may further render or model, in the map, additional changes caused by the changes in the identified one or more entities or objects over time. In some examples, the modelling engine 120 may incorporate a detour during a construction, and remove the detour from the map after construction is completed.

The determining engine 121 may, using data or one or more images captured at a specific location, determine an amount of actual change or a rate of change of one or more of the identified entities over time. In some examples, after an initial map or map data is acquired or generated, the determining engine 121 may, after a specific time period such as a month later, capture updated data and/or images at a location. Information from the updated data and/or images may be compared with the predicted change over time or rate of change as predicted by the predicting engine 118. The determining engine 121 may further determine an amount of actual change of one or more entities not identified as changing over time, such as a tunnel. For example, the determining engine 121 may determine that the tunnel has actually changed over time, for example, during the one-month period. The identifying engine 116 may reidentify the tunnel as an entity or object that changes over time and the predicting engine 118 may predict a rate of change over time of the tunnel.

The navigating engine 122 may perform one or more navigating or driving tasks for the vehicle 102 as a result of the modelled map. The navigating engine 122 may determine a detour route for the vehicle 102 to take as a result of construction, and based on whether the construction is still ongoing.

Figure 2:
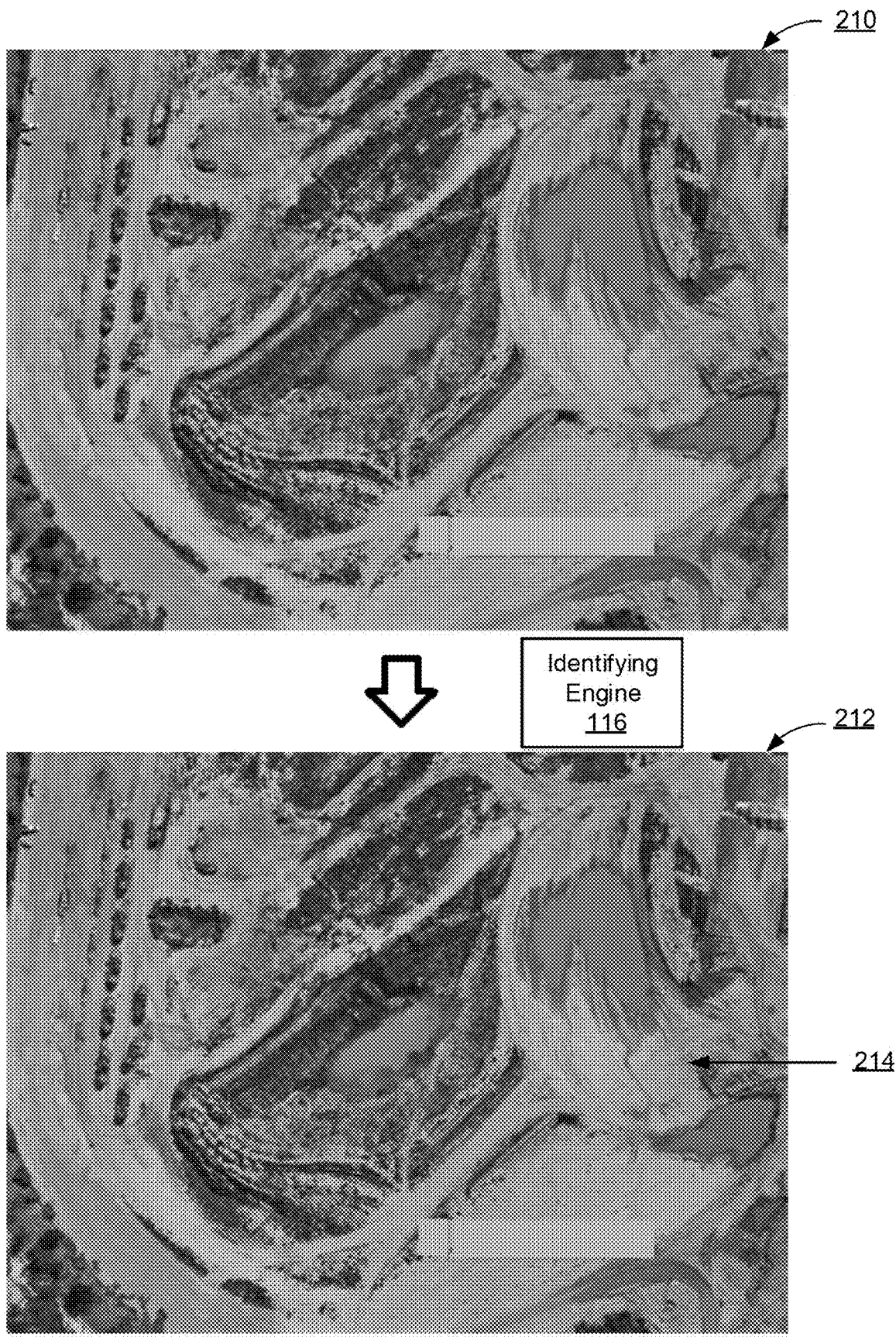
FIGS. 2-5 illustrate example implementations of a computing system according to embodiments of the present disclosure.

FIG. 2 illustrates an example implementation of a computing system of the present disclosure. In FIG. 2, an identifying engine such as the identifying engine 116 may, from map data 210, identify one or more entities or objects that change with respect to time, in map data 212. The identifying engine 116 may identify an entity or object 214, such as a construction site, by recognizing certain associated features such as an excavation and construction vehicles. The identifying engine 116 may further identify the entity or object 214 such as the construction site based on a rate of change and/or a type of change of one or more features or regions. For example, the identifying engine 116 may identify the entity or object 214 such as the construction site in response to a terrain of a region changing, or in response to grass and other plants being removed.

Figure 3:
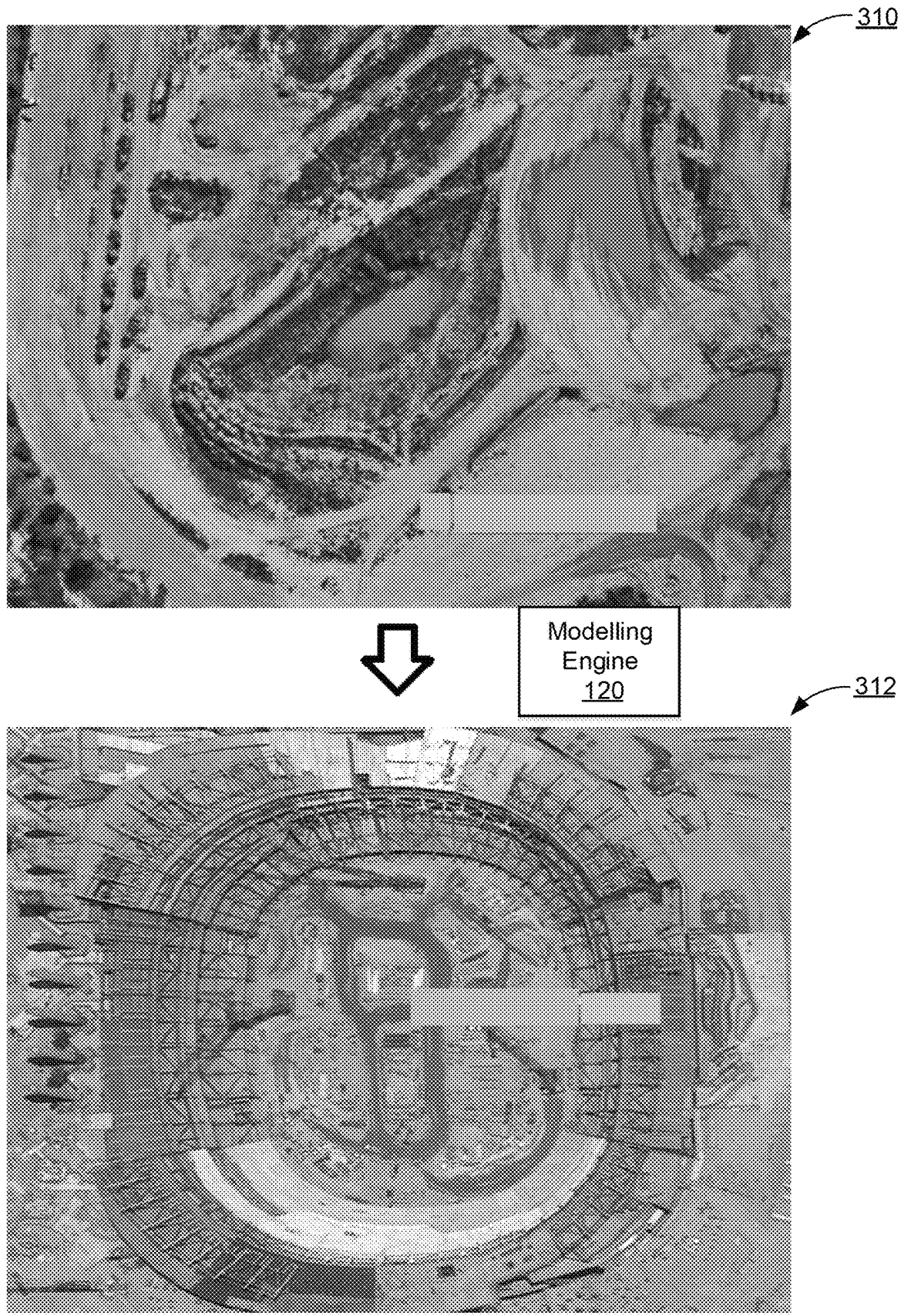

FIG. 3 illustrates an example implementation of a computing system of the present disclosure. In FIG. 3, a modelling engine such as the modelling engine 120 may, from map data 310, render or generate a map based on a predicted status of an identified object. The map data 310 may correspond to the map data 212 of FIG. 2. In the example of FIG. 3, the modelling engine 120 may generate a map 312 to reflect a predicted status of the construction at a specific time, such as 6 months after the map 310 was acquired or generated. The modelling engine 120 may show specific details of the construction based on historical data or images of previous constructions, such as constructions in that region and/or of that type or scale. The modelling engine 120 may identify a type or scale of a construction by comparing features of the construction with features from previous images of one or more previous constructions. The modelling engine 120 may determine a proportion of the features of the construction that match the features from the previous images of the one or more previous constructions. In response to the proportion of the features of the construction that match the features from the previous images of the one or more previous constructions exceeding a threshold, the modelling engine 120 may determine that the construction is of a same type or scale as the one or more previous constructions.

Figure 4:
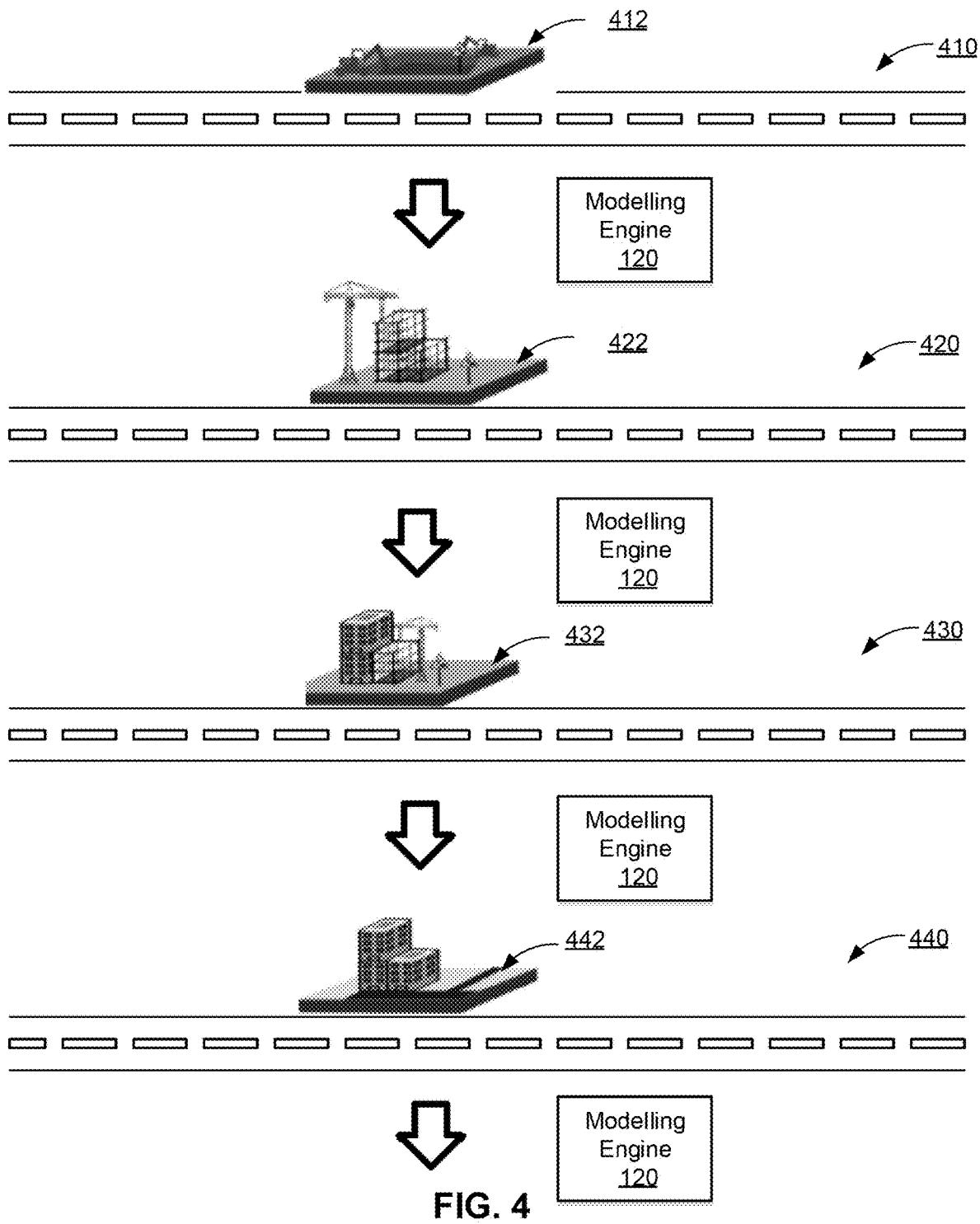
Figure 4:
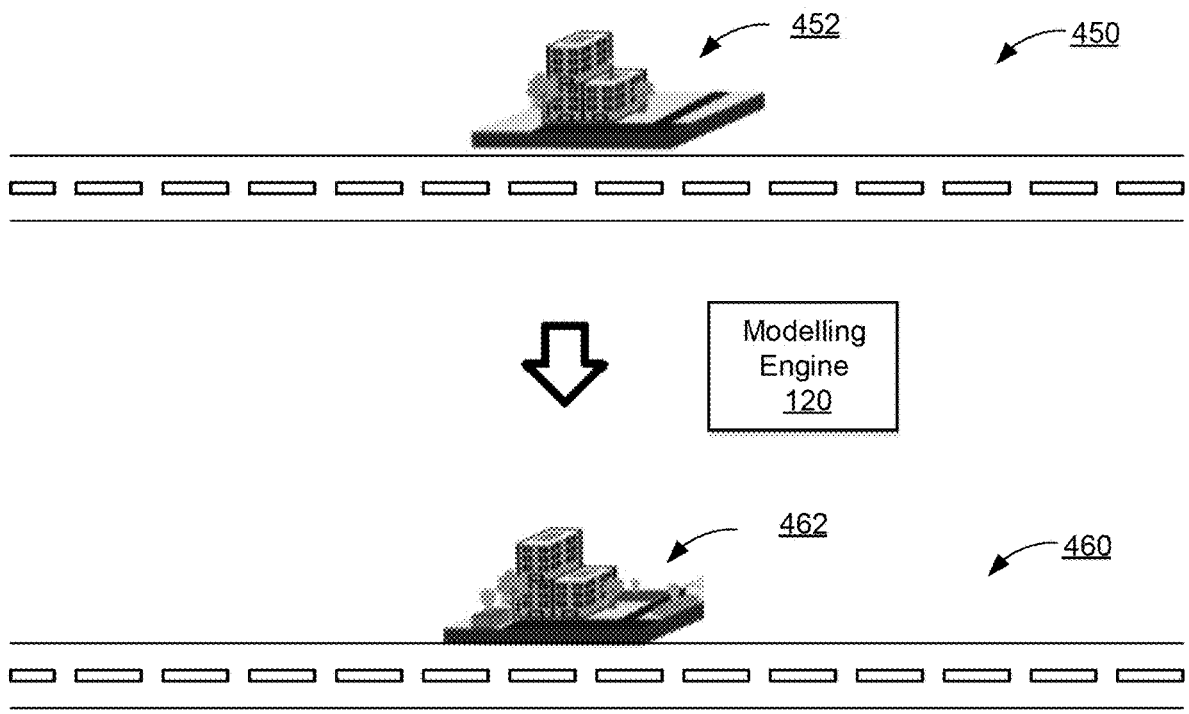

FIG. 4 illustrates an example implementation of a computing system of the present disclosure. In FIG. 4, a modelling engine such as the modelling engine 120 may, from map data such as map data 310 of FIG. 3, render or generate a map to reflect predicted statuses of one or more identified entities or objects at particular times. For instance, the modelling engine 120 may generate map data 410 which includes a predicted status 412 of an identified entity such as a construction site, at a particular time after the map 310 was acquired or generated. For example, the map data 410 may be generated one month after the map 310 was acquired or generated. As another example, the modelling engine 120 may generate map data 420 which includes a predicted status 422 of an identified entity such as a construction site, at a particular time after the map 310 was acquired or generated. For example, the map data 420 may be generated two months after the map 310 was acquired or generated. As another example, the modelling engine 120 may generate map data 430 which includes a predicted status 432 of an identified entity such as a construction site, at a particular time after the map 310 was acquired or generated. For example, the map data 430 may be generated three months after the map 310 was acquired or generated. As another example, the modelling engine 120 may generate map data 440 which includes a predicted status 442 of an identified entity such as a construction site, at a particular time after the map 310 was acquired or generated. For example, the map data 440 may be generated four months after the map 310 was acquired or generated. As another example, the modelling engine 120 may generate map data 450 which includes a predicted status 452 of an identified entity such as a construction site, at a particular time after the map 310 was acquired or generated. For example, the map data 450 may be generated five months after the map 310 was acquired or generated. As another example, the modelling engine 120 may generate map data 460 which includes a predicted status 462 of an identified entity such as a construction site, at a particular time after the map 310 was acquired or generated. For example, the map data 460 may be generated six months after the map 310 was acquired or generated. The modelling engine 120 may generate map data that reflects a predicted status of one or more identified entities or objects at a specific time.

Figure 5:
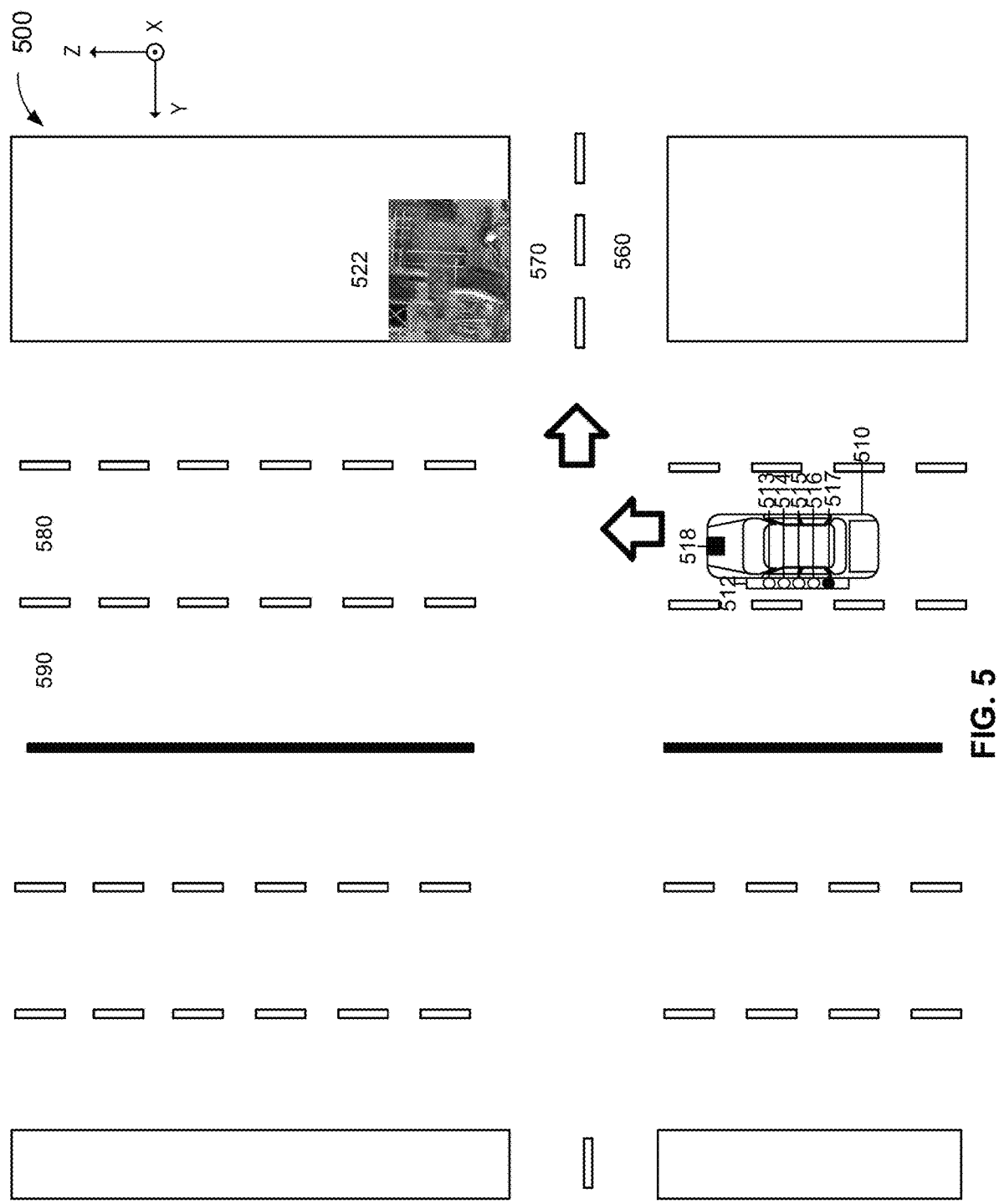

In the implementation 500 of FIG. 5, a vehicle 510, which may be implemented as the vehicle 102, may be driving in a lane 580. The vehicle 510 may comprise an active Doppler sensor 518 and/or other sensors used to obtain data of an environment of the vehicle 510. The vehicle 510 may comprise an array 512 of lights, which may include lights 513, 514, 515, 516, and 517. In some embodiments, the array 512 may comprise any number of lights. Five lights are shown merely for illustrative purposes. For example, the vehicle 510, via the navigating engine 122, may determine, from the map data such as the map data 410, 420, 430, 440, 450, or 460, and utilize the map data to determine a location of a construction site 522. The navigating engine 122 may further determine a detour resulting from the construction site 522. For example, the navigating engine 122 may determine a detour into lanes 570 and 560, if the vehicle 510 was previously driving in lanes 580 and 590.

Figure 6:
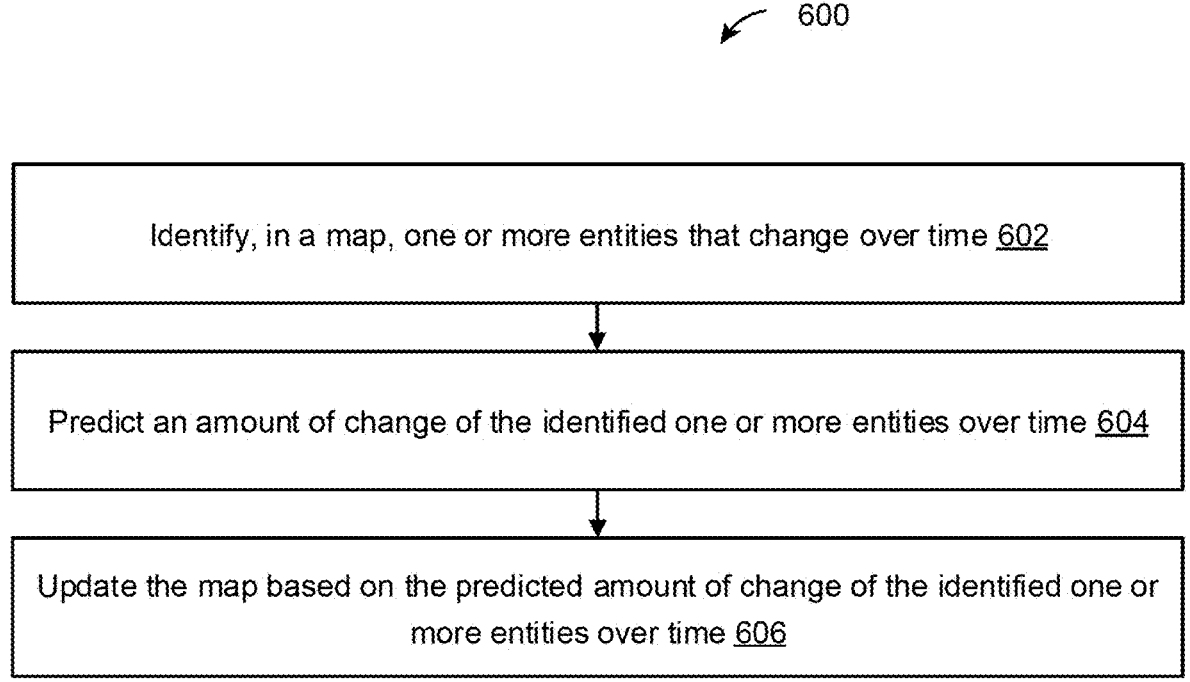
FIG. 6 illustrates a flowchart of an example of a method of identifying, in a map, one or more entities that change over time, predicting an amount of change of the identified one or more entities over time, and updating the map based on of the predicted amount of change of the identified one or more entities over time.

FIG. 6 illustrates a flowchart of a method according to some embodiments. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In step 602, one or more entities that change over time may be identified in a map. In step 604, an amount of change over time or a rate of change over time of the identified one or more entities may be predicted. In step 606, the map may be updated based on the predicted amount of change of the identified one or more entities over time.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
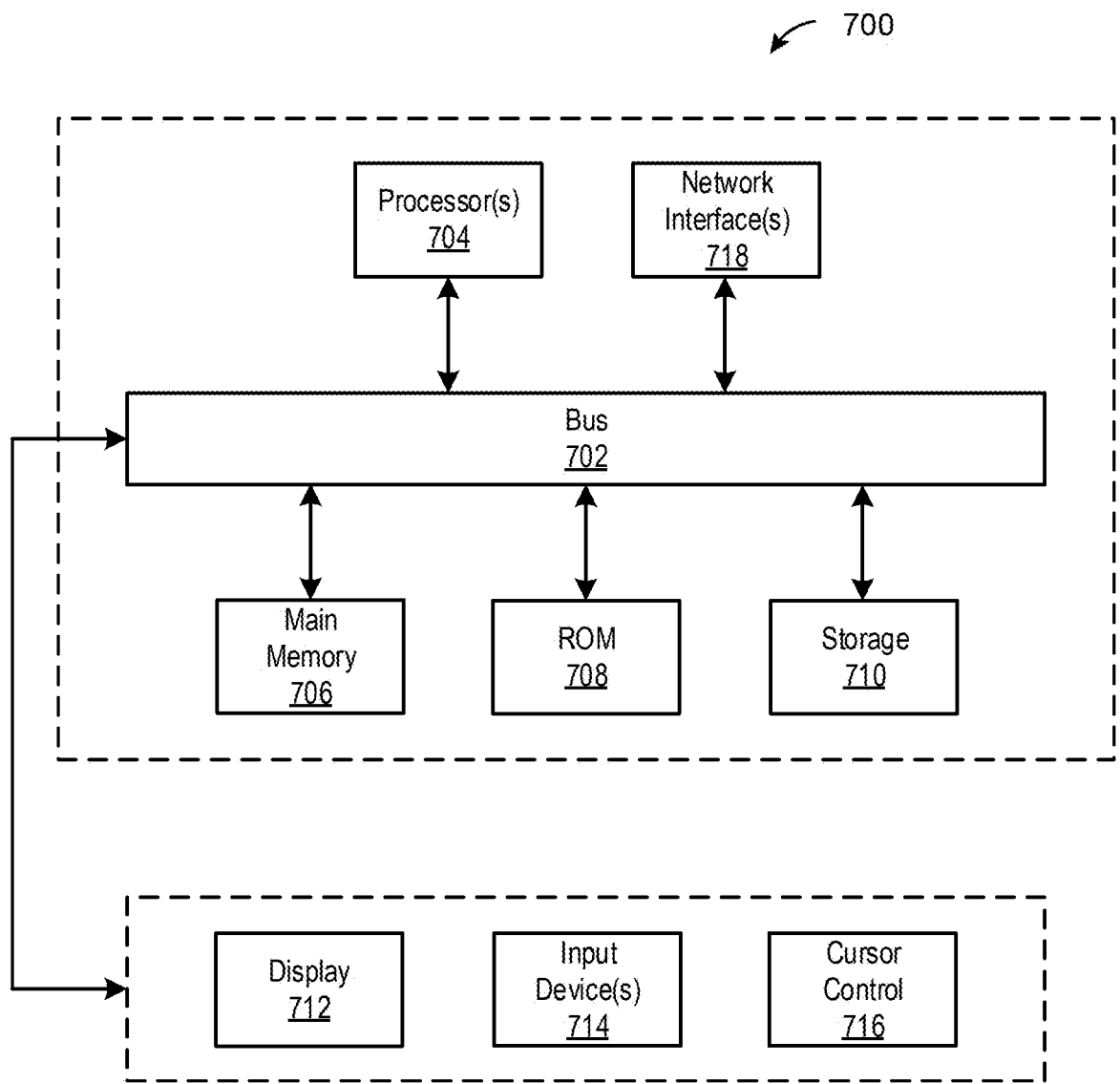
FIG. 7 is a diagram of an example computer system for implementing the features disclosed herein.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to output device(s) 712, such as a cathode ray tube (CRT) or LCD display (or touch screen), for displaying information to a computer user. Input device(s) 714, including alphanumeric and other keys, are coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts.

Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   one or more processors; and
   a memory storing instructions that, when executed by the one or more processors, causes the system to perform:
   identifying, in a map, one or more entities that change seasonally over time;
   predicting an amount of change of the identified one or more entities over time based on one or more weather conditions;
   obtaining an updated image corresponding to the one or more entities at a particular time after the one or more entities have been identified;
   determining, from the updated image, an actual amount of change;
   updating the predicted amount of change based on the actual amount of change;
   generating an updated map based on the updated predicted amount of change of the one or more entities over time; and
   navigating a vehicle based on the updated map.

2. The system of claim 1, wherein the instructions further cause the system to perform:
   comparing the actual amount of change to the predicted amount of change;
   based on the comparison, determining whether any of the one or more of the identified entities is correctly identified; and
   in response to determining that any of the one or more of the identified entities is not correctly identified, correcting an identification of any of the one or more of the identified entities any of the one or more of the identified entities determined not to be correctly identified.

3. The system of claim 1, wherein the predicting an amount of change of the identified one or more entities over time comprises predicting the amount of change based on historical information of the identified one or more entities over time.

4. The system of claim 1, wherein the instructions further cause the system to perform:
   determining an amount of actual change of an entity identified as a static entity;
   in response to the amount of actual change of the entity exceeding a threshold amount, reidentifying the entity as a changing entity over time.

5. The system of claim 1, wherein the
   one or more entities that change seasonally change from a first state to a second state and back to the first state.

6. The system of claim 5, wherein the one or more entities that change seasonally comprise plants, wildlife, and precipitation.

7. A method implemented by a computing system including one or more processors and storage media storing machine-readable instructions, wherein the method is performed using the one or more processors, the method comprising:
   identifying, in a map, one or more entities that change seasonally over time;
   predicting an amount of change of the identified one or more entities over time based on one or more weather conditions;
   obtaining an updated image corresponding to the one or more entities at a particular time after the one or more entities have been identified;
   determining, from the updated image, an actual amount of change;
   updating the predicted amount of change based on the actual amount of change;

generating an updated map based on the updated predicted amount of change of the one or more entities over time; and navigating a vehicle based on the updated map.

8. The method of claim 7, further comprising:

comparing the actual amount of change to the predicted amount of change;

based on the comparison, determining whether any of the one or more of the identified entities is correctly identified; and in response to determining that any of the one or more of the identified entities is not correctly identified, correcting an identification of any of the one or more of the identified entities any of the one or more of the identified entities determined not to be correctly identified.

9. The method of claim 7, wherein the predicting an amount of change of the identified one or more entities over time comprises predicting the amount of change based on historical information of the identified one or more entities over time.

10. The method of claim 7, further comprising:

determining an amount of actual change of an entity identified as a static entity;

in response to the amount of actual change of the entity exceeding a threshold amount, reidentifying the entity as a changing entity over time.

11. The method of claim 7, wherein the one or more entities that change seasonally change from a first state to a second state and back to the first state.

12. The method of claim 11, wherein the one or more entities that change seasonally comprise plants, wildlife, and precipitation.

13. The system of claim 1, wherein the one or more entities comprises a construction site, and the updated map is based on a predicted amount of change of the construction site; and the instructions further cause the system to perform:

determining a detour route of the vehicle based on the rendered updated map;

adding the detour route onto the rendered updated map; and navigating the vehicle based on the determined detour route.

14. The system of claim 13, wherein the identification of the construction site is in response to determining, from images at different times, a change in a terrain corresponding to the construction site, grass and plants previously present within the construction site being removed, and a presence of construction vehicles.

15. The system of claim 1, wherein the instructions further cause the system to perform:

determining a rate of degradation of infrastructure over time due to mechanical, chemical, and thermal stresses; and the generating of the updated map is based on the determined rate of degradation of the infrastructure over time.

16. The system of claim 15, wherein the infrastructure comprises buildings, streets, bridges, and power plants.

17. The system of claim 1, wherein the weather conditions comprise temperature, an amount of precipitation, and an amount of sunlight.

* * * * *